United States Patent [19]
McCall

[11] Patent Number: 5,896,685
[45] Date of Patent: Apr. 27, 1999

[54] LICENSE PLATE COVER SECURITY DEVICE

[76] Inventor: Sebastian McCall, 516 Poplar St., Philadephia, Pa. 19123

[21] Appl. No.: 09/073,781

[22] Filed: May 6, 1998

[51] Int. Cl.$^6$ .................................................. G09F 7/00
[52] U.S. Cl. .............................................. 40/202; 40/209
[58] Field of Search ............................. 40/202, 201, 209

[56] References Cited

U.S. PATENT DOCUMENTS

| | | |
|---|---|---|
| 2,710,475 | 6/1955 | Salzman . |
| 3,340,639 | 9/1967 | Savage . |
| 4,182,062 | 1/1980 | Krokos et al. . |
| 5,073,842 | 12/1991 | Monroe ........................................ 40/201 |
| 5,640,793 | 6/1997 | Fischer ........................................ 40/718 |
| 5,659,986 | 8/1997 | Simmons . |

*Primary Examiner*—Cassandra H. Davis
*Attorney, Agent, or Firm*—Henderson & Sturm

[57] ABSTRACT

A license plate cover security device 10 for use with a license plate 100 dimensioned to be received in a license plate receptacle 200 formed in the chassis 201 of a vehicle 202 equipped with an alarm system 203. The security device 10 includes a license plate cover member 20 operatively associated with a wiring system 40 connected to the alarm system 203. The wiring system 40 includes at least one electrical switch plate 45 operatively associated with one of the conventional fasteners 50 used to secure the license plate cover member 20 and the license plate 100 to the license plate receptacle 200 wherein the removal of the conventional fastener 50 will activate the vehicle alarm system 203.

4 Claims, 1 Drawing Sheet

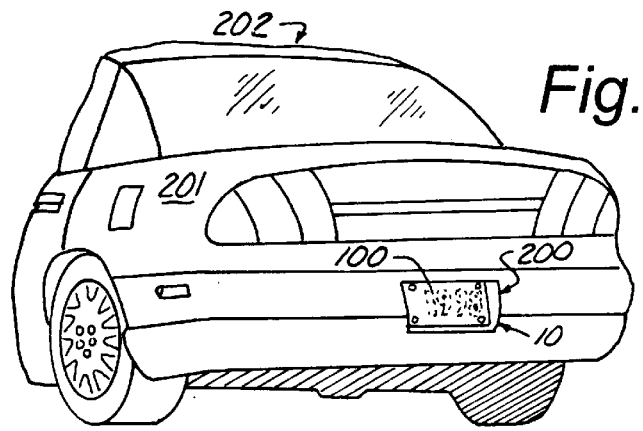
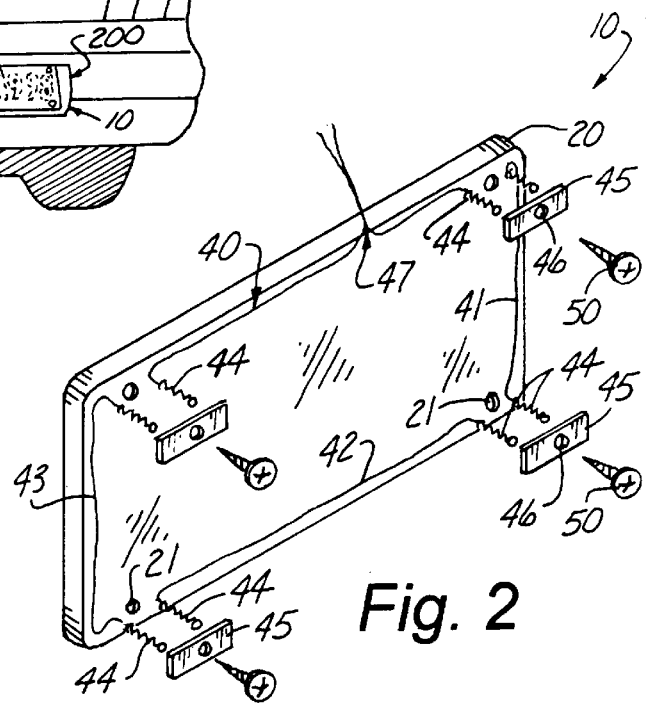
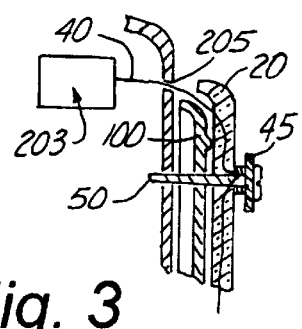
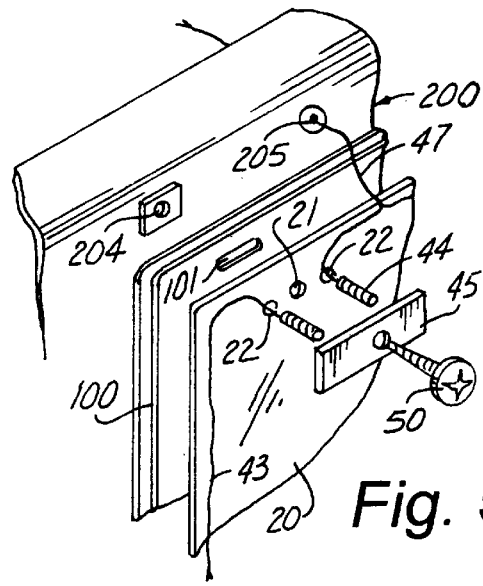
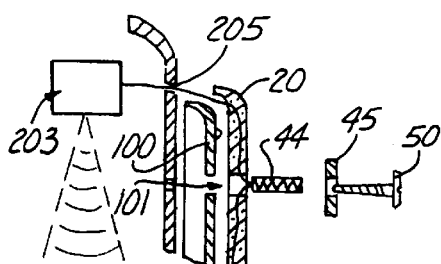
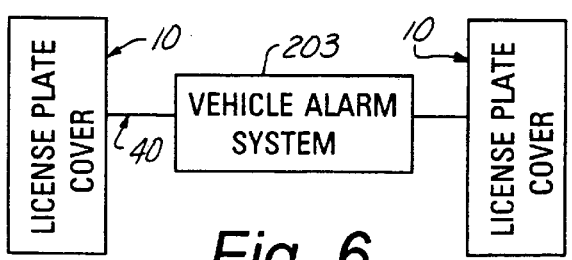

LICENSE PLATE COVER SECURITY DEVICE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of car alarms in general, and in particular to a security system that will sound an alarm when someone tries to steal a car license plate by removing the license plate cover.

2. Description of Related Art

As can be seen by reference to the following U.S. Pat. Nos. 2,710,475; 3,340,639; 4,182,062; and 5,659,986, the prior art is replete with myriad and diverse license plate cover security devices that lock a license plate within the license plate cover.

While all of the aforementioned prior art constructions are more than adequate for the basic purpose and function for which they have been specifically designed, they are uniformly deficient with respect to their failure to provide a simple, efficient, and practical device to warn the car owner and passerby that a person is attempting to illegally remove the license plate from a vehicle.

Unfortunately, in today's society there are certain individuals that require the unlawful possession of vehicle license plates in the furtherance of other illegal activities and it is a relatively simple task to defeat most of the prior art locking mechanisms to gain access to the license plates without drawing unwanted attention to themselves.

As a consequence of the foregoing situation, there has existed a longstanding need for a new and improved type of license plate cover having a conventional securing mechanism that is tied into the vehicle alarm system such that the removal of any one of the fasteners triggers the vehicle alarm, and the provision of such a construction is a stated objective of the present invention.

BRIEF SUMMARY OF THE INVENTION

Briefly stated, the license plate cover security device that forms the basis of the present invention comprises a license plate cover member and a wiring system operatively associated with both the license plate cover member and the vehicle alarm system whereby the removal of one of the conventional fasteners used to connect the license plate cover member to both the license plate and the vehicle will trigger the vehicle alarm system.

As will be explained in greater detail further on in the specification, the license plate cover member is provided with a plurality of mounting apertures to receive the conventional fasteners used to secure the cover member to both the vehicle and the license plate. Furthermore, each mounting aperture is flanked by a pair of apertures dimensioned to receive spring loaded electrical contacts which form a portion of the electrical wiring system.

In addition, the electrical wiring system also includes a plurality of electrical switch plates which overlie adjacent pairs of electrical contacts wherein each of the electrical switch plates are operatively associated with one of the conventional fasteners whereby the removal of one of the fasteners will trigger the vehicle alarm system to prevent the unauthorized removal of the license plate from the vehicle.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the license plate security device installed on a vehicle;

FIG. 2 is an exploded perspective view of the device;

FIG. 3 is an isolated cross sectional view of one corner of the device with the conventional fastener installed;

FIG. 4 is an isolated cross sectional view of one corner of the device with the conventional fastener removed;

FIG. 5 is an exploded perspective view of one corner of the device; and

FIG. 6 is a schematic diagram of the electrical connection between the vehicle license plate holders and the vehicle alarm system.

DETAILED DESCRIPTION OF THE INVENTION

As can be seen by reference to the drawings, and in particularly to FIG. 1, the license plate security device that forms the basis of the present invention is designated generally by the reference number 10. The device 10 is specifically designed to fit over a license plate 100 dimensioned to be received in a license plate receptacle 200 formed in the chassis 201 of a vehicle 202 equipped with an alarm system 203 wherein the license plate receptacle 200 are provided with a plurality of threaded apertures 204 dimensioned to receive conventional fasteners 50 to secure the license plates 100 to the chassis 201 in a well recognized manner. Each of the license plate receptacles 200 on the front and rear of the vehicle 202 are provided with at least one additional aperture 205 whose purpose and function will be described in greater detail further on in the specification.

As can best be seen by reference to FIGS. 2 and 5, the device 10 comprises a generally rectangular license plate cover member 20 dimensioned to overlie a license plate 100 and captively engage the license plate 100 to the vehicle chassis 201 in a well recognized manner via conventional fasteners.

In addition, each corner of the license plate cover member 20 is provided with a mounting aperture 21 dimensioned to be aligned with the mounting apertures 101 on the license plate 100 and the threaded apertures 204 in the license plate receptacle 200. The mounting apertures 21 are dimensioned to receive the threaded portion of the conventional fasteners 50 in a well recognized manner.

Still referring to FIGS. 2 and 5, it can be seen that each corner of the license plate cover member 20 is also provided with a pair of connector apertures 22, 22 disposed on opposite sides of the mounting apertures 21. The connector apertures 22 are dimensioned to receive a portion of the electrical wiring system designated generally as 40 which is partially incorporated into the license plate cover member 20.

The electrical wiring system 40 comprises in general, a plurality of wiring segments 41, 42, 43 arranged around the periphery of the bottom and sides of the cover member 20 wherein the opposite ends of each of the wiring segments 41, 42, 43 are provided with spring loaded electrical contacts 44 whose purpose and function will be described presently.

In addition, each of the corners of the cover member 20 are further provided with an electrical switch plate 45 which forms an electrical connector between the contacts 44 on the adjacent ends of the wiring segments 41, 42, 43 to complete the electrical circuit when the fastening elements 50 pass through the apertures 46 in the switch plates 45 and the aligned apertures 21, 101, and 204 in the cover member 20 license plate 100 and vehicle chassis 201, respectively, as shown in FIG. 3.

As can be seen by reference to FIGS. 2 through 6, the wiring system 40 also includes a bifurcated wiring segment 47 having contacts 44 disposed on its opposite ends. The bifurcated wiring segment 47 passes through aperture 205 in the vehicle chassis 201 and is operatively connected to the vehicle alarm system, such that the removal of any of the conventional fasteners 50 from the license plate cover member 20 as shown in FIG. 4 will break the electrical connection between one of the switch plates 45 and one pair of electrical contacts 44, 44 to activate the vehicle alarm system 203.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A license plate cover security device for use in combination with an apertured license plate dimensioned to be received in an apertured license plate receptacle formed in the chassis of a vehicle having an alarm system wherein the security device comprises:

a generally rectangular license plate cover member adapted to captively engage said license plate to said license plate receptacle via a plurality of conventional fasteners that extends through a plurality of aligned apertures formed in the license plate cover member, the license plate, and the license plate receptacle;

a wiring system operatively connected between said alarm system and said license plate cover member wherein said wiring system includes a plurality of wiring segments connected to said license plate cover member wherein each of the four corners of the license plate cover member are provided with one of said aligned apertures dimensioned to receive one of the conventional fasteners and further provided with a pair of apertures dimensioned to receive one end of selected ones of said plurality of wiring segments wherein the opposite ends of each of the plurality of wiring segments are provided with electrical contacts and switch means operatively associated with said alarm system for activating the alarm system when at least one of the conventional fasteners is removed from engagement with the license plate cover member.

2. The device as in claim 1 wherein each of said electrical contacts are spring loaded.

3. The device as in claim 2 wherein each of the four corners of the license plate cover member are further provided with an electrical switch plate that extends between and is dimensioned to overlie a pair of electrical contacts.

4. The device as in claim 3 wherein each of the electrical switch plates is provided with a central aperture that is dimensioned to receive one of said conventional fasteners.

* * * * *